United States Patent
Khoryaev et al.

(10) Patent No.: US 9,232,437 B2
(45) Date of Patent: Jan. 5, 2016

(54) EVOLVED NODE B, USER EQUIPMENT, AND METHOD FOR OPERATION OF NARROW BANDWIDTH USER EQUIPMENT IN WIDE BANDWIDTH BROADBAND NETWORKS

(71) Applicants: Alexey Vladimirovich Khoryaev, Dzerzhinsk (RU); Andrey Chervyakov, Nizhny Novgorod (RU); Jong-Kae Fwu, Sunnyvale, CA (US)

(72) Inventors: Alexey Vladimirovich Khoryaev, Dzerzhinsk (RU); Andrey Chervyakov, Nizhny Novgorod (RU); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 13/682,950

(22) Filed: Nov. 21, 2012

(65) Prior Publication Data

US 2013/0272215 A1    Oct. 17, 2013

Related U.S. Application Data

(60) Provisional application No. 61/624,185, filed on Apr. 13, 2012.

(51) Int. Cl.
*H04W 72/04* (2009.01)
*H04W 28/08* (2009.01)
(Continued)

(52) U.S. Cl.
CPC .............. *H04W 28/08* (2013.01); *H04L 5/0001* (2013.01); *H04W 24/02* (2013.01); *H04W 28/02* (2013.01); *H04W 36/08* (2013.01); *H04W 72/04* (2013.01); *H04W 72/042* (2013.01); *H04W 74/0808* (2013.01); *H04W 76/023* (2013.01); *H04W 24/10* (2013.01); *H04W 36/0016* (2013.01); *H04W 76/028* (2013.01); *Y02B 60/50* (2013.01)

(58) Field of Classification Search
CPC .. H04W 72/042; H04L 5/0001; H04L 5/0046; H04L 5/0048
USPC ........................................................ 370/373
See application file for complete search history.

(56) References Cited

U.S. PATENT DOCUMENTS 8,937,937 B2 *   1/2015   Lindoff ......................... 370/329
8,948,208 B2 *   2/2015   Malladi ................ H04B 7/0617
                                                        370/503

(Continued)

FOREIGN PATENT DOCUMENTS

WO    WO2012079197 A1 *    6/2012
WO    WO 2012108928 A1 *   8/2012
WO    WO-2013155382 A1    10/2013

OTHER PUBLICATIONS

"International Application Serial No. PCT/US2013/036321, International Search Report mailed Jul. 26, 2013", 3 pgs.

(Continued)

*Primary Examiner* — Edan Orgad
*Assistant Examiner* — Emmanuel Maglo
(74) *Attorney, Agent, or Firm* — Schwegman Lundberg & Woessner, P.A.

(57) ABSTRACT

Apparatuses and methods for supporting operation of narrow bandwidth devices within a broadband network are described herein. A user equipment (UE) may retrieve control channels within a narrow bandwidth device region of a downlink subframe. The control channels may be received in a subcarrier of a new carrier type (NCT) implemented in accordance with a standard of the 3GPP family of standards. Cell-specific reference signals may be excluded on the NCT subcarrier.

23 Claims, 4 Drawing Sheets

(51) Int. Cl.
*H04W 28/02* (2009.01)
*H04L 5/00* (2006.01)
*H04W 74/08* (2009.01)
*H04W 36/08* (2009.01)
*H04W 24/02* (2009.01)
*H04W 76/02* (2009.01)
*H04W 24/10* (2009.01)
*H04W 36/00* (2009.01)

(56) References Cited

U.S. PATENT DOCUMENTS

| | | | | |
|---|---|---|---|---|
| 8,982,759 B2* | 3/2015 | Kim | ............ | H04L 1/0072 370/310 |
| 2005/0245258 A1 | 11/2005 | Classon et al. | | |
| 2010/0067418 A1 | 3/2010 | Parkvall et al. | | |
| 2010/0080139 A1* | 4/2010 | Palanki | ............ | H04B 7/2606 370/252 |
| 2010/0329384 A1* | 12/2010 | Kwak et al. | ............ | 375/295 |
| 2011/0092231 A1* | 4/2011 | Yoo | ............ | H04B 1/7097 455/501 |
| 2011/0103243 A1* | 5/2011 | Larsson | ............ | H04L 5/001 370/252 |
| 2011/0170496 A1* | 7/2011 | Fong et al. | ............ | 370/329 |
| 2011/0211489 A1 | 9/2011 | Chung et al. | | |
| 2011/0317597 A1* | 12/2011 | Wan | ............ | H04W 72/1289 370/281 |
| 2012/0069795 A1* | 3/2012 | Chung | ............ | H04B 7/15542 370/315 |
| 2012/0122472 A1* | 5/2012 | Krishnamurthy | ..... | H04L 5/0053 455/456.1 |
| 2013/0033998 A1* | 2/2013 | Seo | ............ | H04W 24/00 370/252 |
| 2013/0094411 A1* | 4/2013 | Zhang | ............ | H04W 72/04 370/281 |
| 2013/0114528 A1* | 5/2013 | Chen | ............ | H04L 5/0053 370/329 |

OTHER PUBLICATIONS

"International Application Serial No. PCT/US2013/036321, Written Opinion mailed Jul. 26, 2013", 7 pgs.

"Proposed SID: Provision of low-cost MTC UEs based on LTE", TSG RAN meeting #53. RP-111112. Vodafone. Agenda item: 13.1.1, (Sep. 13, 2011), 6 pgs.

"Update to LTE Carrier Aggregation Enhancements WID", 3GPP TSG RAN meeting #54. RP-111749. Nokia Corporation, Nokia Siemens Networks. Agenda Item: 11.4.4., (Dec. 6, 2011), 6 pgs.

* cited by examiner

EVOLVED NODE B, USER EQUIPMENT, AND METHOD FOR OPERATION OF NARROW BANDWIDTH USER EQUIPMENT IN WIDE BANDWIDTH BROADBAND NETWORKS

CROSS-REFERENCE TO RELATED APPLICATIONS

This application claims priority to U.S. Provisional Patent Application No. 61/624,185 entitled "ePDCCH spatial diversity and definition of distributed PRB," filed on Apr. 13, 2012, the content of which is incorporated herein by reference in its entirety.

TECHNICAL FIELD

Embodiments pertain to wireless communications. More particularly, the present disclosure relates to support for narrow bandwidth devices operating in a wide bandwidth broadband network through the provision of narrowband control channel transmissions over carriers of a new carrier type (NCT).

BACKGROUND

Current 3$^{rd}$ Generation Partnership Project (3GPP) long term evolution (LTE) specifications define a scalable set of signal bandwidths, ranging from relatively low bandwidths (e.g., 1.4 MHz and 3 MHz) to relatively high bandwidths (e.g., 20 MHz). A user equipment (UE) operating in a wireless network often supports the full set of bandwidths. Moreover, there is an underlying assumption that evolved Node Bs (eNodeBs) and UEs attached to eNodeBs use the same operating bandwidth.

UEs operating in a typical wireless network can include terminals for use by a human user as well as machine-type communication (MTC) devices and machine-to-machine devices (M2M) that often operate with little or no regular human interaction. Many MTC and M2M devices do not require high throughput and low latency performance characteristics and thus can successfully operate in narrow signal bandwidths, for example 1.4 MHz and 3 MHz signal bandwidths. Recent trends have shown an increased interest in providing support for narrow bandwidth MTC and M2M devices operating in a cell using a wider bandwidth. Mobile network operators may wish to introduce support of narrow bandwidth devices because of demands from the low end MTC market to substantially decrease the cost of LTE terminal. However, due to PHY layer constraints legacy systems do not support operation of narrow bandwidth devices. For example, LTE legacy systems use wide bandwidth transmission of LTE control channels on the downlink and MTC and M2M devices are thereby required to support wide bandwidth signals in order to reliably operate on the broadband network.

Thus, there exists a general need to provide methods and apparatuses to enable or optimize operation of narrow bandwidth devices in wideband LTE deployments by providing narrow bandwidth transmission of control channels.

DETAILED DESCRIPTION

The following description is presented to enable any person skilled in the art to create and use enhanced Node Bs (eNodeBs), user equipment (UEs), and related methods for supporting operation of narrow bandwidth UEs on new carrier types (NCTs). The methods and systems described herein incorporate UE-based and eNodeB-assisted techniques for operating on a narrow bandwidth within a wide bandwidth broadband network by receiving control channels over an NCT carrier. In at least one embodiment, narrow bandwidth device regions are allocated in a downlink and/or uplink subframe and control channels are allocated within that narrow bandwidth device region. Cell-specific reference signals may be excluded on NCT carriers at certain subframes.

Various modifications to the embodiments will be readily apparent to those skilled in the art, and the generic principles defined herein may be applied to other embodiments and applications without departing from the scope of the present disclosure. Moreover, in the following description, numerous details are set forth for the purpose of explanation. However, one of ordinary skill in the art will realize that embodiments may be practiced without the use of these specific details. In other instances, well-known structures and processes are not shown in block diagram form in order not to obscure the description of the embodiments with unnecessary detail. Thus, the present disclosure is not intended to be limited to the embodiments shown, but is to be accorded the widest scope consistent with the principles and features disclosed herein.

Figure 1:
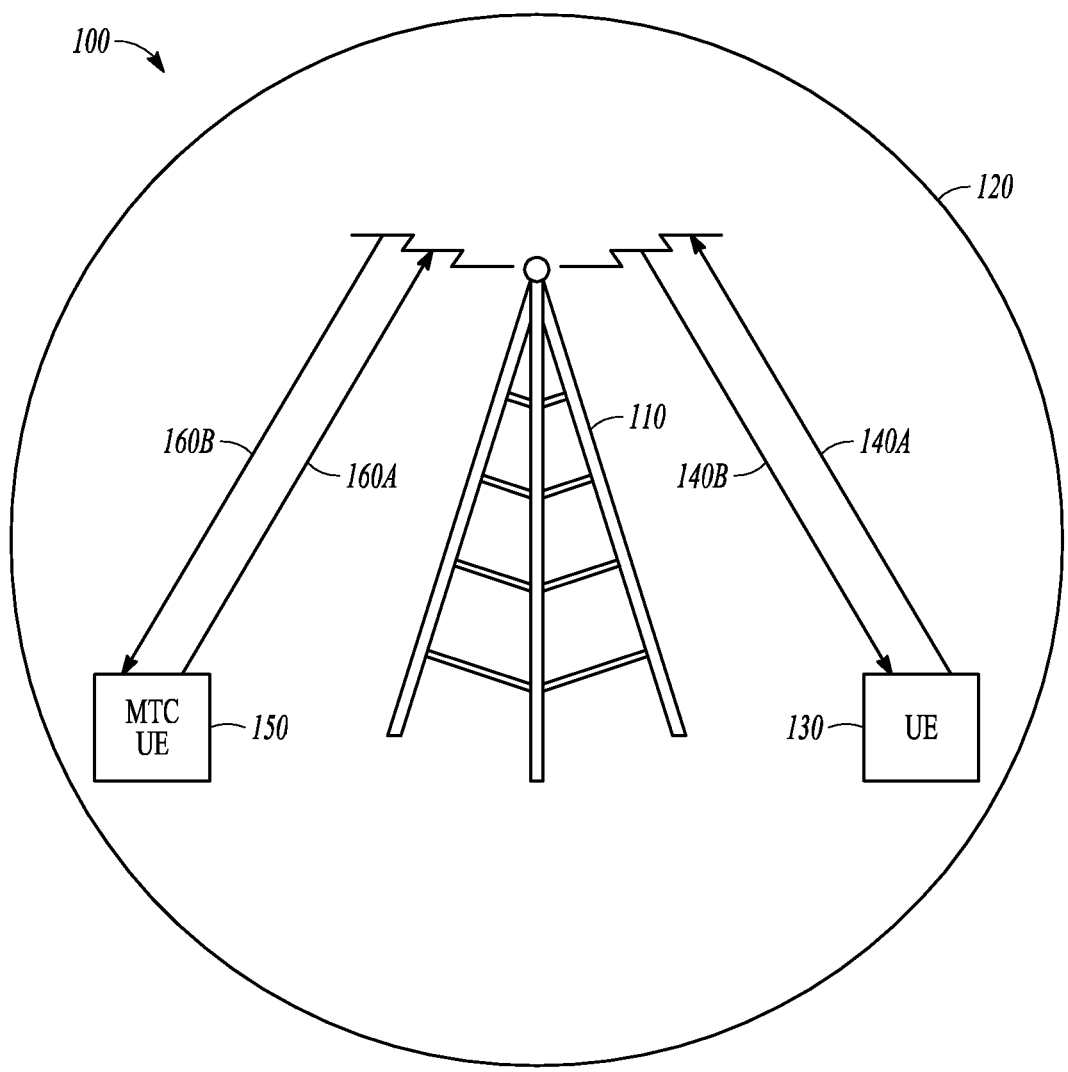
FIG. 1 illustrates an example portion of a wireless communications network according to some embodiments.

FIG. 1 illustrates an example portion of a wireless communications network 100 in which example embodiments may be implemented. In one embodiment, the wireless communications network 100 comprises an evolved universal terrestrial radio access network (EUTRAN) using the 3rd Generation partnership Project (3GPP) long term evolution (LTE) standard. In one embodiment, the wireless communications network 100 includes an evolved Node B (eNodeB) 110. While only one eNodeB 110 is depicted, it will be understood that the wireless communications network 100 may include more than one eNodeB 110.

The eNodeB 110 serves a certain geographic area, or cell 120. One or more user equipments (UEs) 130 may associate with the eNodeB 110 when the UE 130 is within the cell 120. The UE 130 may be a UE of a type typically controlled by, used, or operated by a human user. For example, the UE 130 may be a smartphone, tablet computer, or laptop computer. The UE 130 may communicate with the eNodeB 110 over an uplink 140a and downlink 140b.

One or more machine type communication (MTC) UEs 150 may also associate with the eNodeB 110 when the MTC UE 150 is within the cell 120. The MTC UE 150 may communicate with the eNodeB 110 over an uplink 160a and downlink 160b. The MTC UE 150 may transmit infrequently when compared to, for example, the UE 130, and the MTC UE 150 may operate using a relatively low data rate and exhibit low power consumption relative to the UE 130. The MTC UE 150 may be a low power device.

Because human-oriented devices such as the UE 130 may have high data rates and use broader bandwidths, wireless network specifications, such as for example the 3GPP LTE specification, may prohibit or eliminate the usage of narrow bandwidth devices such as the MTC UE 150 in order to optimize performance and data rates for wide bandwidth devices such as the UE 130.

The 3GPP LTE specification specifies wideband transmission of control channels on the downlink such that control channels are transmitted over a control channel region in a wideband (e.g., 10 MHz). This may restrict operation of the narrow bandwidth MTC UE 150 within the broadband network, because the MTC UE 150 typically operates with bandwidths of 1.4 MHz or 3 MHz. The legacy PDCCH channel is always transmitted in distributed mode over the whole signal bandwidth, which makes the PDCCH channel impossible to decode for devices operating in narrow bandwidth. In future releases of LTE technology (i.e., Release 11 and beyond), the new enhanced physical downlink control channel (ePDCCH) may be configured to be transmitted in localized mode and perform resource assignment within a localized part of full system bandwidth, and the MTC UE 150 may be able to decode the ePDCCH before receiving the assigned data resource.

The use of narrow bandwidth control channels can facilitate reception of control information by narrow bandwidth devices. Example embodiments use carriers of one or more new carrier types (NCT), to be introduced with 3GPP LTE Release 12, for narrow bandwidth control channel and data channel communications between the eNodeB 110 and the MTC UE 150. Example embodiments provide for localized transmission of control channels, for example ePDCCH, within a narrow bandwidth device region (NBDR) over NCT carriers. This may enable or permit operation of narrow bandwidth devices, for example the MTC UE 150, in a wide bandwidth broadband network.

Figure 2:
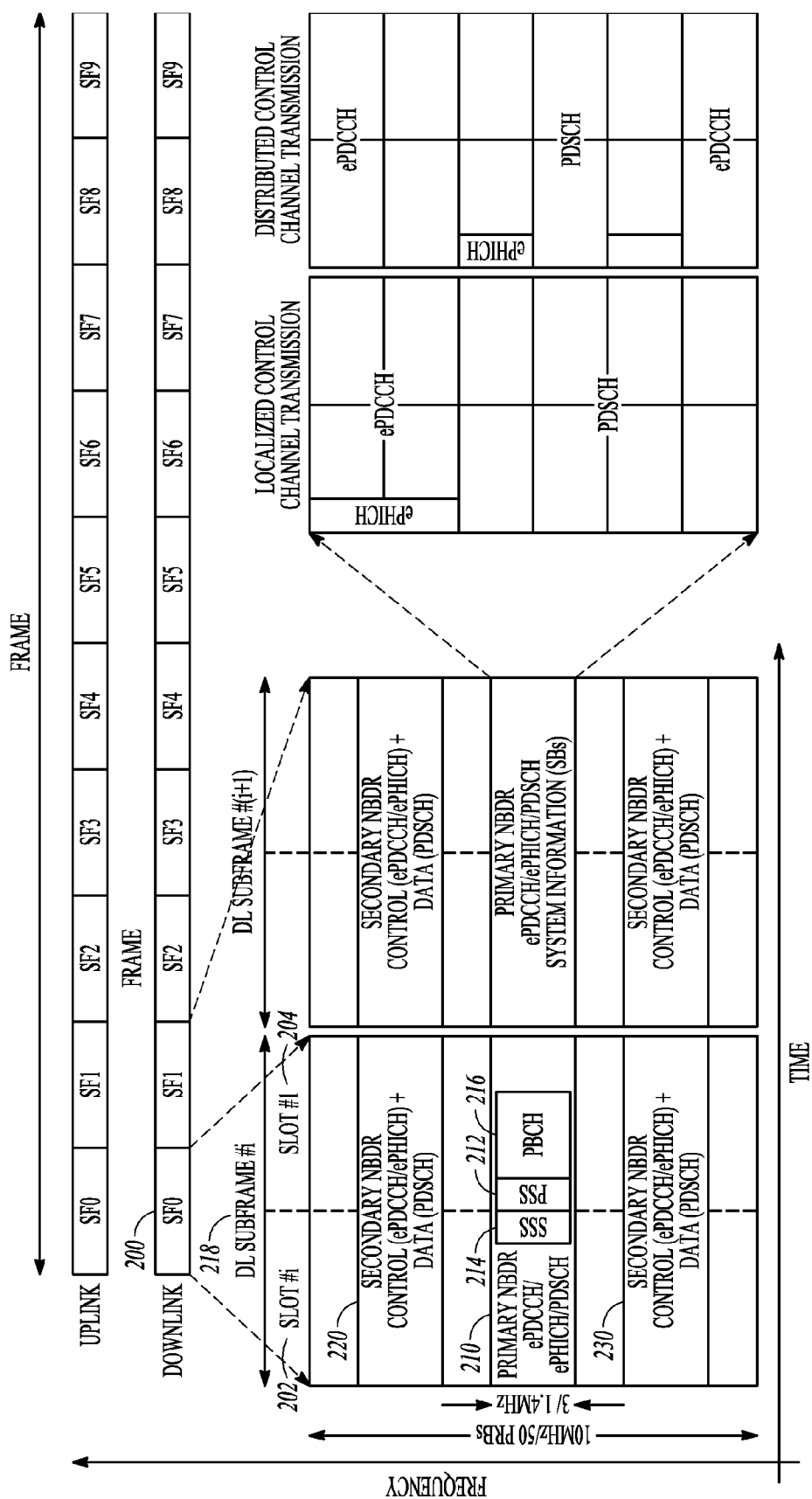
FIG. 2 illustrates eNodeB transmissions in accordance with some embodiments.

FIG. 2 illustrates allocations of a wideband downlink subframe in accordance with at least one example embodiment.

Referring to FIG. 2, in an embodiment, a downlink frame 200 of a signal used to transmit data may include a first slot 202 and a second slot 204. A primary NBDR 210 may be located in the central portion of the signal bandwidth spectrum where the eNodeB 110 transmits primary synchronization signals (PSS) 212, secondary synchronization signals (SSS) 214, and the physical broadcast channel (PBCH) 216. The primary NBDR 210 may share a first slot 202 with the PSS 212 and the SSS 214. The downlink subframe 218 may have a bandwidth of at least 10 MHz. The primary NBDR 210 may have a bandwidth of 3 MHz or less. For example, the primary NBDR 210 may have a bandwidth of 1.4 MHz or 3 MHz. Accordingly, the PSS/SSS 212, 214 may be limited to transmission within a narrow bandwidth allocation. Because the bandwidth of the PSS/SSS 212, 214 is limited to narrow bandwidths, either or both the MTC UE 150 and the wideband UE 130 are able to perform system synchronization and are able to process the PSS/SSS 212, 214. The eNodeB 110 may use the primary NBDR 210 for initial synchronization, carrying of the system control information, and indication of the secondary NBDR's 220 position.

Example embodiments may provide localized or distributed ePDCCH and ePHICH resource mapping solutions as shown in FIG. 2. For example, the ePDCCH and ePHICH may comprise contiguous physical resource blocks (PRBs), or the ePDCCH and ePHICH may be included in non-contiguous PRBs.

The primary NBDR 210 may also include control channel elements (CCEs) of the ePDCCH. The CCEs may include common or UE-specific ePDCCH search spaces (not shown) to enable the eNodeB 110 to broadcast control system information and to schedule downlink and uplink transmissions between the eNodeB 110 and UEs being served by the eNodeB 110, including both narrow bandwidth devices such MTC UE 150 and broad bandwidth devices such as UE 130. The number of available CCEs within the primary NBDR 210 may be limited by bandwidth. Therefore, the size of the ePDCCH search space may be reduced and the number of blind decodings may be reduced, resulting in improved performance for downlink control information (DCI) decoding.

The primary NBDR 210 may further include a master information block (MIB) (not shown) and system information broadcast (SIB) messages. The eNodeB 110 may transmit a MIB in a broadcast channel, for example a physical broadcast channel (PBCH) 216. The eNodeB 110 may transmit SIB messages in a shared channel, for example a physical downlink shared channel (PDSCH).

The eNodeB 110 may transmit the downlink subframe 218 to the MTC UE 150 using carriers of a carrier type. The carriers may be legacy carriers or new carrier type (NCT) carriers defined in Release 12 or later of a standard of the 3GPP LTE family of standards. The primary NBDR 210 may be aligned with the physical structure of the ePDCCH (or equivalent) on the NCT carrier.

The eNodeB 110 excludes transmission of cell-specific reference signals (CRSs) on NCT subcarriers in one or more subframes. In some example embodiments, the eNodeB 110 excludes transmission of CRSs on NCT subcarriers in all subframes. In example embodiments, the eNodeB 110 utilizes downlink demodulation reference signal (DMRS)-based transmission modes, which are UE-specific rather than cell specific. The removal of CRSs in NCT subcarriers reduces reference signal overhead and facilitates usage of high capacity MIMO transmission modes.

The eNodeB 110 may further configure at least one secondary NBDR 220, 230 in a portion of the total signal bandwidth spectrum. The eNodeB 110 uses the secondary NBDRs 220, 220 for data communication with the narrow bandwidth MTC UE 150, and the eNodeB 110 may use one or more secondary NBDRs 220, 230 to increase the number of MTC UEs 150 that can simultaneously be served by the eNodeB 110. In an embodiment, the MTC UEs assigned to a particular secondary NBDR 220, 230 may periodically switch to the primary NBDR 210 to receive synchronization signals PSS/SSS 212, 214. In an embodiment, synchronization signals for synchronizing the MTC UE 150 may be defined within the secondary NBDRs 220, 230.

The eNodeB 110 may use the ePDCCH within the primary NBDR 210 to schedule allocations in the secondary NBDRs 220, 230 and vice versa. The secondary NBDRs 220, 230 may be configured by eNodeB 110 using higher layer signaling for each supported bandwidth. The eNodeB 110 may use the primary NBDR 210 for the assignment of secondary NBDRs 220, 230 or for the assignment of a consecutive pattern of different secondary NBDRs 220, 230. The eNodeB 110 may provide this information using a physical control channel, or the eNodeB 110 may provide this information using higher layer signaling, for example, radio resource control (RRC) signaling, system information signaling, broadcast control signaling, or media access control (MAC) signaling. In some embodiments, information for the secondary NBDR 220, 230 may include a value indicating the number of secondary NBDRs 220, 230 included within the current subframe or a number of secondary NBDRs 220, 230 to be included in future subframes. The eNodeB 110 may transmit higher layer control signaling in either the primary NBDR 210 or the secondary NBDRs 220, 230.

In at least one embodiment, the eNodeB 110 may assign secondary NBDDRs 220, 230 to achieve frequency diversity or frequency selectivity gains. In example embodiments, an MTC UE 150 may scan candidate secondary NBDRs 220, 230 and report a preferred secondary NBDR 220, 230 to the eNodeB 110. For example, the MTC UE 150 may report a channel quality metric. Based on the report, the eNodeB 110 may assign the secondary NBDR 220, 230 for MTC UE 150 operation. In further example embodiments, the eNodeB 110 may use frequency diversity to assign secondary NBDRs 220, 230 to the MTC UE 150 using a predefined frequency hopping pattern so that in different transmit time intervals, the MTC UE 150 transmits or receives signals at different frequencies.

The eNodeB 110 may change the location of the primary and secondary NBDRs 210, 220, 230 semi-statically or dynamically, or the eNodeB 110 may configure the locations according to a predefined pattern for each narrow bandwidth device or group of devices served by the eNodeB 110. The location of the primary NBDR 210 may be fixed and defined at the frequency location where the eNodeB 110 transmits synchronization signals PSS/SSS 212, 214 and broadcast channel PBCH 216. Therefore, the MTC UE 150 should support bandwidths of at least 1.4 MHz. In example embodiments, the primary NBDR 210 can further be used for data transmission or data communication between the MTC UE 150 and the eNodeB 110 if the primary NBDR 210 includes data resources in addition to the above-described synchronization, system, and configuration information.

While example embodiments have been described with respect to downlink communications, it will be understood that embodiments may further support or be modified to support uplink communications. In an embodiment, physical uplink shared channel (PUSCH) allocation may be arbitrarily located within the uplink bandwidth but constrained to a maximum number of contiguously located physical resource blocks (PRBs). The size or position of the PUSCH allocation may be controlled through DCIs transmitted inside or within a certain PRB offset relative to the downlink NBDR configured for communication with the MTC UE 150. In other example embodiments, each downlink NBDR may be associated with one or several uplink NBDRs. The relationship between uplink and downlink NBDRs may be configured by higher layer signaling or defined in a specification of the 3GPP LTE family of specifications.

Figure 3:
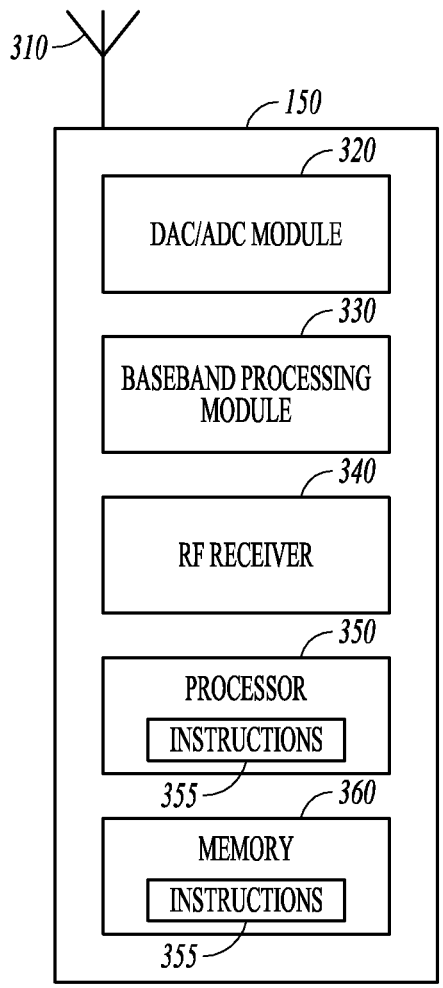
FIG. 3 is a block diagram of a narrow bandwidth device in accordance with example embodiments.

FIG. 3 shows the basic components of an MTC UE 150 capable of operating as a narrow bandwidth device in a broadband network. The MTC UE 150 includes one or more antennas 310 arranged to communicate with a base station (BS), the eNodeB 110, or other types of wireless local area network (WLAN) access points. The MTC UE 150 further includes a digital-to-analog converter (DAC)/analog-to-digital converter (ADC) module 320, a baseband processing module 330, a radio frequency (RF) receiver 340, a processor 350, instructions 355, and a memory 360.

Example embodiments allow a narrow bandwidth wireless device MTC UE 150 to monitor a part (e.g., 1.4 MHz or 3 MHz) of the wide bandwidth spectrum (e.g., 10 or 20 MHz). The bandwidth reduction and corresponding signal processing for the narrow bandwidth wireless device can be performed either in a RF receiver 340 or in a baseband processing module 330 for downlink only, uplink only or both downlink and uplink. The downlink signal can be received on the antenna 310. The RF receiver 340 can be configured to receive or transmit an analog signal and one or more primary NBDRs 210 and secondary NBDRs 220, 230.

In an embodiment, the RF receiver 340, the DAC/ADC module 320, and a baseband processing module 330 of the MTC UE 150 may be arranged to support narrow bandwidth signal processing. The DAC/ADC module 320 may be arranged to convert between an analog channel signal and a digital modulated signal, which may be decoded (for reception) or encoded (for transmission). In example embodiments, after decoding of system information in the primary NBDR 210, in embodiments for which the eNodeB 110 has assigned secondary NBDRs 220, 230, the baseband processing module 330 may transmit a command to the RF receiver 340 to apply a carrier offset for the secondary NBDR 220, 230 and to adjust the MTC UE 150 frequency. The RF receiver 340 may further be tuned to a center of the assigned secondary NBDR 220, 230 for further filtering and processing. The carrier offset mechanism, implemented in the analog or digital domain, can allow the components of the MTC UE 150 to operate at the narrow bandwidth, and provide switching between the primary NBDR 210 and the secondary NBDR 220, 230.

In other example embodiments, the RF receiver 340 may receive the full wide bandwidth subframe, which passes through the DAC/ADC module 320. In at least these embodiments, the baseband processing module 330 filters the specified NBDR 210, 220, 230. In at least these example embodiments, the MC UE 150 may be characterized as having a simpler or more cost-effective design because processing of the NBDR 210, 220, 230 may be performed in the baseband processing module 330.

The processor 350 may include logic or code to enable the MTC UE 150 to process signals received from the network through the antenna 310. The processor 350 may include code or other instructions 355 to allow the MTC UE 150 to operate in a narrow bandwidth in a wide bandwidth broadband network. The instructions 355 may further allow the MTC UE 150 to process narrowband control channel transmissions received within a narrowband device region of a downlink subframe (e.g., downlink subframe 218). The instructions 355 may additionally or alternatively reside in the memory 360.

Figure 4:
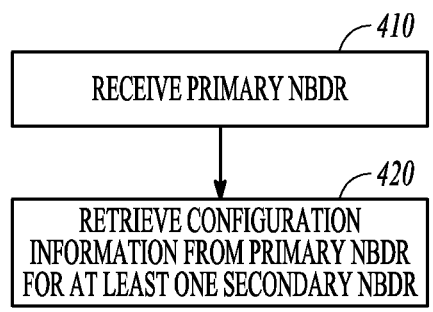
FIG. 4 is a flow diagram of a procedure for operating a narrow bandwidth device in accordance with example embodiments.

FIG. 4 illustrates operations implemented by a UE, for example the MTC UE 150, for communicating in a wide bandwidth broadband network. In operation 410, the MTC UE 150 receives a primary NBDR 210. The primary NBDR 210 may include an ePDCCH, an ePHICH, and a PDSCH. The primary NBDR 210 may have a bandwidth of 3 MHz or less and the primary NBDR 210 may be a subset of frequency resources within a wide bandwidth subframe with a bandwidth of at least 10 MHz.

In operation 420, the MTC UE 150 retrieves, from the primary NBDR 210, configuration information for at least one secondary NBDR 220, 230. The MTC UE 150 may select a preferred secondary NBDR 220, 230 from the at least one secondary NBDR 220, 230, and the MTC UE 150 may notify the eNodeB 110 of this selection. The MTC UE 150 may generate a carrier signal offset for the at least one secondary NBDR 220, 230 relative to the subcarrier of the primary NBDR 210 and then adjust a radio frequency (RF) receiver 340 to a center frequency of the secondary NBDR 220, 230.

Figure 5:
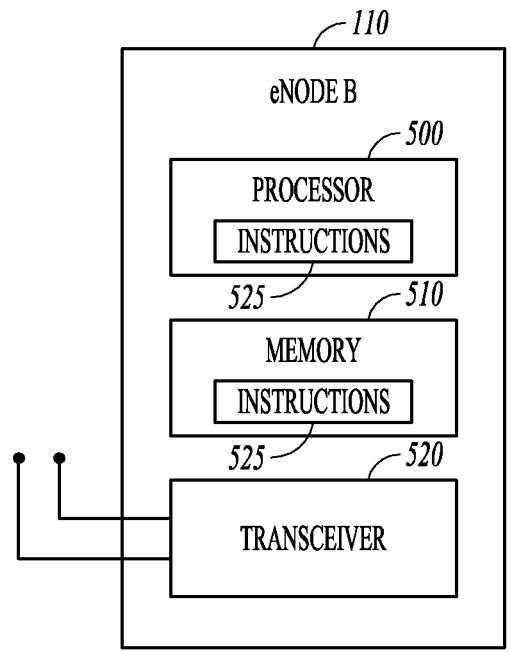
FIG. 5 is a block diagram of an eNodeB in accordance with example embodiments.

FIG. 5 illustrates an example block diagram showing details of eNodeB 110 according to some embodiments. The eNodeB 110 includes a processor 500, a memory 510, a transceiver 520, and instructions 525. The eNodeB 110 may include other elements (not shown).

The processor 500 comprises one or more central processing units (CPUs), graphics processing units (GPUs), or both. The processor 500 provides processing and control functionalities for the eNodeB 110. Memory 510 comprises one or more transient and static memory units configured to store instructions 525 and data for the eNodeB 110. The transceiver 520 comprises one or more transceivers including a multiple-input and multiple-output (MIMO) antenna to support MIMO communications. The transceiver 520 receives uplink transmissions and transmits downlink transmissions, among other things, from and to the MTC UE 150 and the UE 130 respectively.

The instructions 525 comprise one or more sets of instructions or software executed on a computing device (or machine) to cause such computing device (or machine) to perform any of the methodologies discussed herein. The instructions 525 (also referred to as computer- or machine-executable instructions) may reside, completely or at least partially, within the processor 500 and/or the memory 510 during execution thereof by the eNodeB 110. The processor 500 and memory 510 also comprise machine-readable media.

Figure 6:
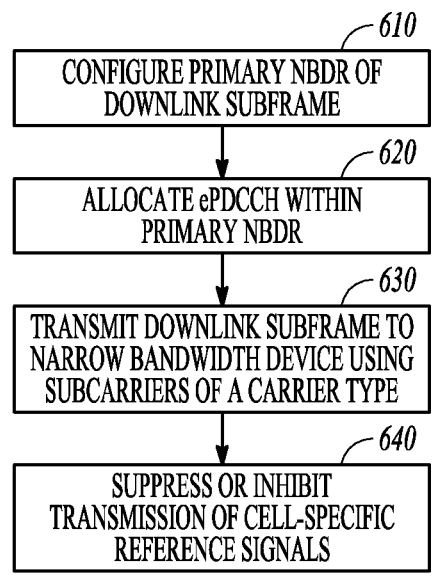
FIG. 6 is a flow diagram of a method for communicating with a narrow bandwidth device operating a wide bandwidth broadband network.

FIG. 6 illustrates operations for communicating with a narrow bandwidth device, for example MTC UE 150, in a wide bandwidth broadband network. In operation 610, the eNodeB 110 configures a primary NBDR 210 of a downlink subframe 218. The primary NBDR 210 may be located in a central portion of a signal bandwidth spectrum. The primary NBDR 210 was described above with respect to FIG. 2.

In operation 620, the eNodeB 110 allocates, within the primary NBDR 210, an enhanced physical data control channel (ePDCCH).

In operation 630, the eNodeB 110 transmits the downlink subframe 218 to the MTC UE 150 using carriers of a carrier type. The carriers may be of a new carrier type (NCT) defined in a standard of the 3GPP LTE family of standards as described above with respect to FIG. 2. In operation 640, the eNodeB 110 does not transmit CRSs on NCT subcarriers at certain subframes. In other words, the eNodeB 110 excludes CRS transmission on NCT subcarriers at certain or at all subframes of the downlink frame.

Example embodiments described above may allow MTC UEs to coexist with wide bandwidth UEs in a wide bandwidth network. Equipment costs for MTC UEs may be reduced by allowing MTC UEs to remove support for the receiving of wideband control channel information. Mobile network operators may experience an increased revenue stream by providing support for MTC UEs operating in wide bandwidth networks.

The embodiments as described above may be implemented in various hardware configurations that may include a processor for executing instructions that perform the techniques described. Such instructions may be contained in a suitable storage medium from which they are transferred to a memory or other processor-executable medium.

It will be appreciated that, for clarity purposes, the above description describes some embodiments with reference to different functional units or processors. However, it will be apparent that any suitable distribution of functionality between different functional units, processors or domains may be used without detracting from embodiments. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present inventive subject matter has been described in connection with some embodiments, it is not intended to be limited to the specific form set forth herein. One skilled in the art would recognize that various features of the described embodiments may be combined in accordance with the disclosure. Moreover, it will be appreciated that various modifications and alterations may be made by those skilled in the art without departing from the scope of the disclosure.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) comprising processing circuitry to:
   operate, using a narrow bandwidth, in a wide bandwidth broadband network;
   retrieve, from a downlink subframe, channels within a primary narrow bandwidth device region (NBDR), the primary NBDR being a subset of frequency resources within a wide bandwidth subframe, the primary NBDR being allocated within a central part of a signal spectrum in which primary synchronization signals (PSS) and secondary synchronization signals (SSS) are received, and the channels including a control channel;
   process control channels in the primary NBDR, wherein the primary NBDR is received in a new carrier type (NCT) implemented in accordance with a standard of the 3GPP family of standards, retrieve, from the primary NBDR, configuration information for at least one secondary NBDR allocated in a different part of the signal spectrum separate from the central part of the signal spectrum, and wherein the PSS and SSS are not received in the secondary NBDR.

2. The UE of claim 1, wherein the channels include an enhanced physical downlink control channel (ePDCCH), an enhanced physical hybrid ARQ indicator channel (ePHICH), and a physical downlink shared channel (PDSCH).

3. The UE of claim 1, wherein
   cell-specific reference signals (CRSs) are suppressed on the NCT at one or more downlink subframes of a downlink frame.

4. The UE of claim 3, wherein CRSs are suppressed on all downlink subframes of the downlink frame.

5. The UE of claim 1, wherein the at least one secondary NBDR using frequency resources within the downlink subframe that are not used by the primary NBDR.

6. The UE of claim 5, wherein the processing circuitry is further configured to:
   process baseband signals to receive primary NBDR information;
   generate a carrier signal offset for the at least one secondary NBDR and adjust a receiver to a center frequency of the at least one secondary NBDR.

7. The UE of claim 5, further configured to:
   retrieve information for more than one secondary NBDR;
   select a preferred secondary NBDR from the more than one secondary NBDR; and
   notify an evolved Node B (eNodeB) of the selection.

8. An evolved Node B (eNodeB) to communicate with a narrow bandwidth device in a wide bandwidth broadband network, the eNodeB comprising:

a configuration module arranged to configure a primary narrow bandwidth device region (NBDR) of a downlink subframe, and allocate a downlink control channel within the primary NBDR; and a transceiver module arranged to transmit the downlink subframe to the narrow bandwidth device on subcarriers of a first carrier type, wherein the first carrier type is a new carrier type (NCT) implemented in accordance with a standard of the 3GPP family of standards;

transmit at least one secondary NBDR in a region separate from the primary NBDR; and transmit primary synchronization signals (PSS) and secondary synchronization signals (SSS) in the primary NBDR and refrain from transmitting PSS and SSS in the secondary NBDR.

9. The eNodeB of claim 8, wherein the eNodeB is further configured to exclude transmission of cell-specific reference signals (CRSs) on carriers of the first carrier type.

10. The eNodeB of claim 8, wherein the configuration module is further arranged to allocate, within the primary NBDR, an enhanced physical data control channel (ePDCCH), an enhanced physical hybrid ARQ indicator channel (ePHICH), and a physical downlink shared channel (PDSCH).

11. The eNodeB of claim 8, wherein the primary NBDR is allocated in a central part of a signal bandwidth spectrum.

12. The eNodeB of claim 8, wherein the primary NBDR has a bandwidth lower than a total signal bandwidth available for transmission at eNodeB.

13. The eNodeB of claim 8, wherein control signaling is used to assign the at least one secondary NBDR.

14. The eNodeB of claim 11, wherein the primary NBDR is aligned with a synchronization signal in the central part of the signal bandwidth spectrum.

15. A method for communicating with a narrow bandwidth device in a wide bandwidth broadband network, the method comprising:

configuring, at an evolved Node B (eNodeB), a primary narrow bandwidth device region (NBDR) of a downlink subframe, the primary NBDR being located in a central portion of a signal bandwidth spectrum in which primary synchronization signals (PSS) and secondary synchronization signals (SSS) are transmitted;

configuring, at the eNodeB, a secondary NBDR in a different part of the signal bandwidth spectrum separate from the central portion and in which PSS and SSS are not transmitted;

allocating, within the primary NBDR, an enhanced physical downlink control channel (ePDCCH);

transmitting the downlink subframe to the narrow bandwidth device using subcarriers of a first carrier type, wherein the first carrier type is a new carrier type (NCT) implemented in accordance with a standard of the 3GPP family of standards; avoiding transmission of cell-specific reference signals (CRSs) on subcarriers of the first carrier type.

16. The method of claim 15, wherein the allocating further comprises allocating an enhanced physical hybrid ARQ indicator channel (ePHICH) and a physical downlink shared channel (PDSCH).

17. The method of claim 15, wherein the primary NBDR has a bandwidth which is lower than or equal to the total signal bandwidth available for signal transmission.

18. The method of claim 15, further comprising aligning the primary NBDR with a synchronization signal in the central portion of the signal bandwidth spectrum.

19. The method of claim 15, further comprising:
including information for the at least one secondary NBDR within the primary NBDR.

20. The method of claim 19, wherein the information for the at least one secondary NBDR comprises at least one a user equipment (UE) assignment of secondary NBDRs, a secondary NBDR frequency hopping pattern, and a value indicating a number of secondary NBDRs.

21. A method for communicating, by a narrow bandwidth device, in a wide bandwidth broadband network, the method comprising:

receiving a primary narrow bandwidth device region (NBDR) having allocated therein an enhanced physical data control channel (ePDCCH), an enhanced physical hybrid ARQ indicator channel (ePHICH), and a physical downlink shared channel (PDSCH), the primary NBDR having a bandwidth of 3 megahertz (MHz) or less and the primary NBDR being a subset of frequency resources within a wide bandwidth subframe with a bandwidth of at least 10 MHz and including a portion of the bandwidth in which primary synchronization signals (PSS) and secondary synchronization signals (SSS) are received; and retrieving configuration information, from the primary NBDR, for at least one secondary NBDR wherein the PSS and SSS are not received in the secondary NBDR.

22. The method of claim 21, further comprising:
selecting a preferred secondary NBDR from the at least one secondary NBDR; and
notifying an evolved Node B (eNodeB) of the selection.

23. The method of claim 21, further comprising:
generating a carrier signal offset for the at least one secondary NBDR relative to the subcarrier of the primary NBDR; and
adjusting a radio frequency (RF) receiver to a center frequency of the secondary NBDR.

* * * * *